United States Patent
Acheson et al.

(10) Patent No.: US 12,235,367 B2
(45) Date of Patent: Feb. 25, 2025

(54) NAVIGATION SYSTEM WITH EMBEDDED SOFTWARE DEFINED RADIO

(71) Applicant: BAE SYSTEMS Information and Electronic Systems Integration Inc., Nashua, NH (US)

(72) Inventors: John E. Acheson, Anamosa, IA (US); Michael N. Kloos, Atkins, IA (US); Nathaniel L. James, Marion, IA (US); Mitchell Dennis, Cedar Rapids, IA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 228 days.

(21) Appl. No.: 17/953,512

(22) Filed: Sep. 27, 2022

(65) Prior Publication Data

US 2024/0103182 A1 Mar. 28, 2024

(51) Int. Cl.
*G01S 19/37* (2010.01)
(52) U.S. Cl.
CPC .................................. *G01S 19/37* (2013.01)
(58) Field of Classification Search
CPC .......... G01S 19/37; G01S 19/01; G01S 19/13; G01S 19/31; G01S 19/33; G01S 19/35; G01S 11/00; G01S 11/02; G01S 11/08; H04B 1/69; H04B 1/707; H04B 1/7073; H04B 1/7075; H04B 1/70758; H04B 7/26; H04B 7/2662; H04B 7/2671; H04B 7/2678; H04B 7/2687; H04B 7/2693
See application file for complete search history.

(56) References Cited

U.S. PATENT DOCUMENTS

| | | | | |
|---|---|---|---|---|
| 6,906,996 | B2* | 6/2005 | Ballantyne | H04L 1/0003 |
| | | | | 375/135 |
| 7,542,848 | B2* | 6/2009 | Ho | G01S 19/37 |
| | | | | 342/357.77 |
| 7,548,787 | B2* | 6/2009 | Feher | H04L 27/2017 |
| | | | | 607/60 |

(Continued)

OTHER PUBLICATIONS

Kloos et al., Multi-Stage Multi-Burst Signal Acquisition, U.S. Appl. No. 18/593,437 filed Mar. 1, 2024.

(Continued)

*Primary Examiner* — James M Perez
(74) *Attorney, Agent, or Firm* — Scott J. Asmus

(57) ABSTRACT

Techniques are provided for employing an embedded software defined radio (SDR) in a navigation system. A navigation system implementing the techniques according to an embodiment includes a global positioning system (GPS) receiver configured to acquire and track received GPS signals. The system also includes an SDR configured to process received communication signals. The communication signals include timing data. The SDR is further configured to calculate position and navigation data based on a combination of the processed communication signals and the tracked GPS signals provided by the GPS receiver. The system further includes a system timer configured to provide a common time base for use by the GPS receiver and the SDR. The navigation system is implemented in an application specific integrated circuit (ASIC).

20 Claims, 8 Drawing Sheets

(56) References Cited

U.S. PATENT DOCUMENTS

| | | | | |
|---|---|---|---|---|
| 7,561,881 | B2* | 7/2009 | Feher | A61B 5/01 370/335 |
| 7,573,863 | B2* | 8/2009 | Boland | H04W 72/12 370/350 |
| 7,847,730 | B2* | 12/2010 | Ryba | G01S 19/03 342/386 |
| 7,904,041 | B2* | 3/2011 | Feher | H04L 5/1453 348/14.02 |
| 7,949,405 | B2* | 5/2011 | Feher | H04W 4/025 607/60 |
| 7,978,774 | B2* | 7/2011 | Feher | H04L 27/2649 375/260 |
| 8,098,753 | B2* | 1/2012 | Feher | H04L 27/2017 375/295 |
| 8,150,453 | B2* | 4/2012 | Feher | H04L 27/2017 370/338 |
| 8,189,703 | B2* | 5/2012 | Feher | H04L 27/2627 375/295 |
| 8,190,193 | B2* | 5/2012 | Feher | H04L 27/2071 455/552.1 |
| 8,259,822 | B1* | 9/2012 | Feher | H04W 12/06 375/259 |
| 8,311,140 | B2* | 11/2012 | Feher | G16H 15/00 375/316 |
| 8,542,715 | B2* | 9/2013 | Feher | H04W 88/06 370/320 |
| 8,930,137 | B2* | 1/2015 | Van Diggelen | G01S 19/06 701/485 |
| 8,996,061 | B2* | 3/2015 | Brittain | H04W 88/06 455/73 |
| 9,049,985 | B2* | 6/2015 | Feher | H04L 5/1453 |
| 9,173,566 | B2* | 11/2015 | Feher | H04L 27/2649 |
| 9,264,877 | B2* | 2/2016 | Feher | H04B 1/69 |
| 9,319,212 | B2* | 4/2016 | Feher | G16H 10/60 |
| 9,397,724 | B1* | 7/2016 | Feher | H04W 4/023 |
| 9,432,152 | B2* | 8/2016 | Feher | G16H 10/60 |
| 9,450,716 | B2* | 9/2016 | Feher | A61B 5/0022 |
| 9,537,700 | B2* | 1/2017 | Feher | G08C 17/02 |
| 9,742,605 | B2* | 8/2017 | Feher | H04B 1/69 |
| 9,755,693 | B2* | 9/2017 | Feher | H04W 12/06 |
| 9,755,874 | B2* | 9/2017 | Feher | H04W 4/025 |
| 9,813,270 | B2* | 11/2017 | Feher | A61B 5/7475 |
| 10,009,956 | B1* | 6/2018 | Feher | H04L 27/2627 |
| 10,271,378 | B2* | 4/2019 | Feher | H04W 4/02 |
| 10,588,174 | B2* | 3/2020 | Feher | H04L 27/2017 |
| 11,668,843 | B2* | 6/2023 | Gunning | G01S 19/256 701/468 |
| 11,899,120 | B2* | 2/2024 | Grayson | G01S 19/258 |
| 12,032,076 | B2* | 7/2024 | Gunning | G01S 19/074 |
| 12,123,958 | B2* | 10/2024 | Acheson | H04B 1/709 |
| 2004/0037282 | A1* | 2/2004 | Boland | H04W 72/12 701/469 |
| 2005/0136885 | A1* | 6/2005 | Kaltsukis | H04M 3/56 455/404.1 |
| 2006/0052124 | A1* | 3/2006 | Pottenger | H04B 1/0003 455/515 |
| 2006/0071851 | A1* | 4/2006 | Graas | G01S 19/29 342/357.395 |
| 2007/0032246 | A1* | 2/2007 | Feher | H04B 7/04 455/456.1 |
| 2007/0032832 | A1* | 2/2007 | Feher | H04L 5/1453 607/32 |
| 2008/0043868 | A1* | 2/2008 | Feher | H04J 11/00 375/260 |
| 2008/0057886 | A1* | 3/2008 | Feher | H04W 88/06 455/151.1 |
| 2008/0062856 | A1* | 3/2008 | Feher | G16H 15/00 370/335 |
| 2008/0074322 | A1* | 3/2008 | Ryba | G01S 19/11 342/386 |
| 2009/0240308 | A1* | 9/2009 | Feher | H04B 7/04 607/60 |
| 2009/0247187 | A1* | 10/2009 | Feher | H04J 11/00 455/456.1 |
| 2010/0124920 | A1* | 5/2010 | Feher | H04B 7/04 455/426.1 |
| 2010/0253578 | A1* | 10/2010 | Mantovani | G01S 19/25 342/357.77 |
| 2010/0295727 | A1* | 11/2010 | Duffett-Smith | G01S 19/37 342/357.77 |
| 2011/0154411 | A1* | 6/2011 | Feher | A61B 5/0015 725/62 |
| 2011/0265127 | A1* | 10/2011 | Feher | A61B 5/14532 725/62 |
| 2012/0128034 | A1* | 5/2012 | Feher | H04W 88/06 375/E1.033 |
| 2012/0194382 | A1* | 8/2012 | Anderson | G01S 19/34 342/357.29 |
| 2012/0219039 | A1* | 8/2012 | Feher | A61B 5/024 375/219 |
| 2013/0265193 | A1* | 10/2013 | Kennedy | G01S 19/46 342/357.29 |
| 2014/0015690 | A1* | 1/2014 | Feher | G16H 15/00 340/870.18 |
| 2014/0038541 | A1* | 2/2014 | Reiss | H04B 15/00 455/296 |
| 2014/0087722 | A1* | 3/2014 | Brittain | H04W 88/06 455/426.1 |
| 2015/0048972 | A1* | 2/2015 | Kennedy | G01S 5/0289 342/357.29 |
| 2015/0264549 | A1* | 9/2015 | Feher | A61B 5/0022 375/142 |
| 2016/0088473 | A1* | 3/2016 | Feher | H04L 63/0876 455/411 |
| 2016/0127087 | A1* | 5/2016 | Feher | A61B 5/024 455/456.1 |
| 2016/0127165 | A1* | 5/2016 | Feher | A61B 5/01 375/130 |
| 2016/0204826 | A1* | 7/2016 | Feher | H04B 7/04 375/142 |
| 2016/0234669 | A1* | 8/2016 | Feher | A61B 5/01 |
| 2016/0294599 | A1* | 10/2016 | Feher | H04L 27/2649 |
| 2017/0041169 | A1* | 2/2017 | Feher | A61B 5/0015 |
| 2017/0048031 | A1* | 2/2017 | Feher | A61B 5/0015 |
| 2017/0099076 | A1* | 4/2017 | Feher | H04B 7/0413 |
| 2017/0366569 | A1* | 12/2017 | Wilson | G06F 21/44 |
| 2017/0374573 | A1* | 12/2017 | Kleinbeck | H04B 17/23 |
| 2018/0102793 | A1* | 4/2018 | Talty | H04B 1/0035 |
| 2018/0317280 | A1* | 11/2018 | Feher | H04L 27/2649 |
| 2019/0246451 | A1* | 8/2019 | Feher | H04L 63/0876 |
| 2019/0254119 | A1* | 8/2019 | Feher | H04L 63/0876 |
| 2020/0021327 | A1* | 1/2020 | Ciccarelli | H04B 1/18 |
| 2020/0322055 | A1* | 10/2020 | Jones | H04B 10/29 |
| 2020/0371245 | A1* | 11/2020 | Murphy | G01S 19/30 |
| 2021/0072401 | A1* | 3/2021 | Colli-Vignarelli | G01S 19/215 |
| 2021/0199815 | A1* | 7/2021 | Kassas | G01S 19/396 |
| 2021/0239851 | A1* | 8/2021 | Gao | G01C 15/06 |
| 2021/0247519 | A1* | 8/2021 | Reid | G01S 19/072 |
| 2021/0263164 | A1* | 8/2021 | Gunning | G01S 19/07 |
| 2022/0021441 | A1* | 1/2022 | Zhang | H04B 7/18506 |
| 2022/0077877 | A1* | 3/2022 | Payton | H04B 1/0003 |
| 2022/0120917 | A1* | 4/2022 | Ryoo | G01S 19/421 |
| 2022/0171013 | A1* | 6/2022 | Kassas | G01S 5/0246 |
| 2022/0239541 | A1* | 7/2022 | Moghaddam | H04W 56/001 |
| 2023/0003907 | A1* | 1/2023 | Grayson | G01S 19/423 |
| 2023/0023732 | A1* | 1/2023 | Bidmead | G01C 21/165 |
| 2023/0130388 | A1* | 4/2023 | Reid | G01S 19/14 342/357.44 |
| 2023/0318633 | A1* | 10/2023 | Acheson | H04B 1/0007 455/143 |
| 2023/0341559 | A1* | 10/2023 | Sapp | H04L 63/0281 |
| 2024/0103182 | A1* | 3/2024 | Acheson | G01S 19/35 |
| 2024/0125944 | A1* | 4/2024 | Gunning | G01S 19/42 |
| 2024/0142635 | A1* | 5/2024 | Acheson | H04B 1/713 |
| 2024/0255653 | A1* | 8/2024 | Neish | G01S 19/423 |
| 2024/0302532 | A1* | 9/2024 | Reid | G01S 19/02 |
| 2024/0402356 | A1* | 12/2024 | Acheson | G01S 19/37 |

OTHER PUBLICATIONS

(56) References Cited

OTHER PUBLICATIONS

Kloos et al., Multi-Stage Signal Acquisition, U.S. Appl. No. 18/742,663 filed Jun. 13, 2024.
Acheson et al., Id Signal Acquisition and Tracking Device, U.S. Appl. No. 17/654,308 filed Mar. 10, 2022.
International Search Report, PCT/US23/33358, mailed Jan. 12, 2024, 7 pages.

\* cited by examiner

NAVIGATION SYSTEM WITH EMBEDDED SOFTWARE DEFINED RADIO

STATEMENT OF GOVERNMENT INTEREST

This invention was made with United States Government assistance under Contract No. FA8807-19-C-0003, awarded by the United States Government. The United States Government has certain rights in this invention.

FIELD OF DISCLOSURE

The present disclosure relates to navigation systems, and more particularly, to a navigation system that employs an embedded software defined radio (SDR).

BACKGROUND

Navigation systems are used in many applications to provide location and tracking information for a platform. One widely used type of navigation system employs a constellation of global positioning system (GPS) satellites. Time-based signals received from the GPS satellites are used to estimate a range from the platform to the satellites and then to estimate the position of the platform based on those ranges. GPS navigation relies on the ability to receive at least three satellite signals, preferably more, which may not always be possible.

Figure 1:
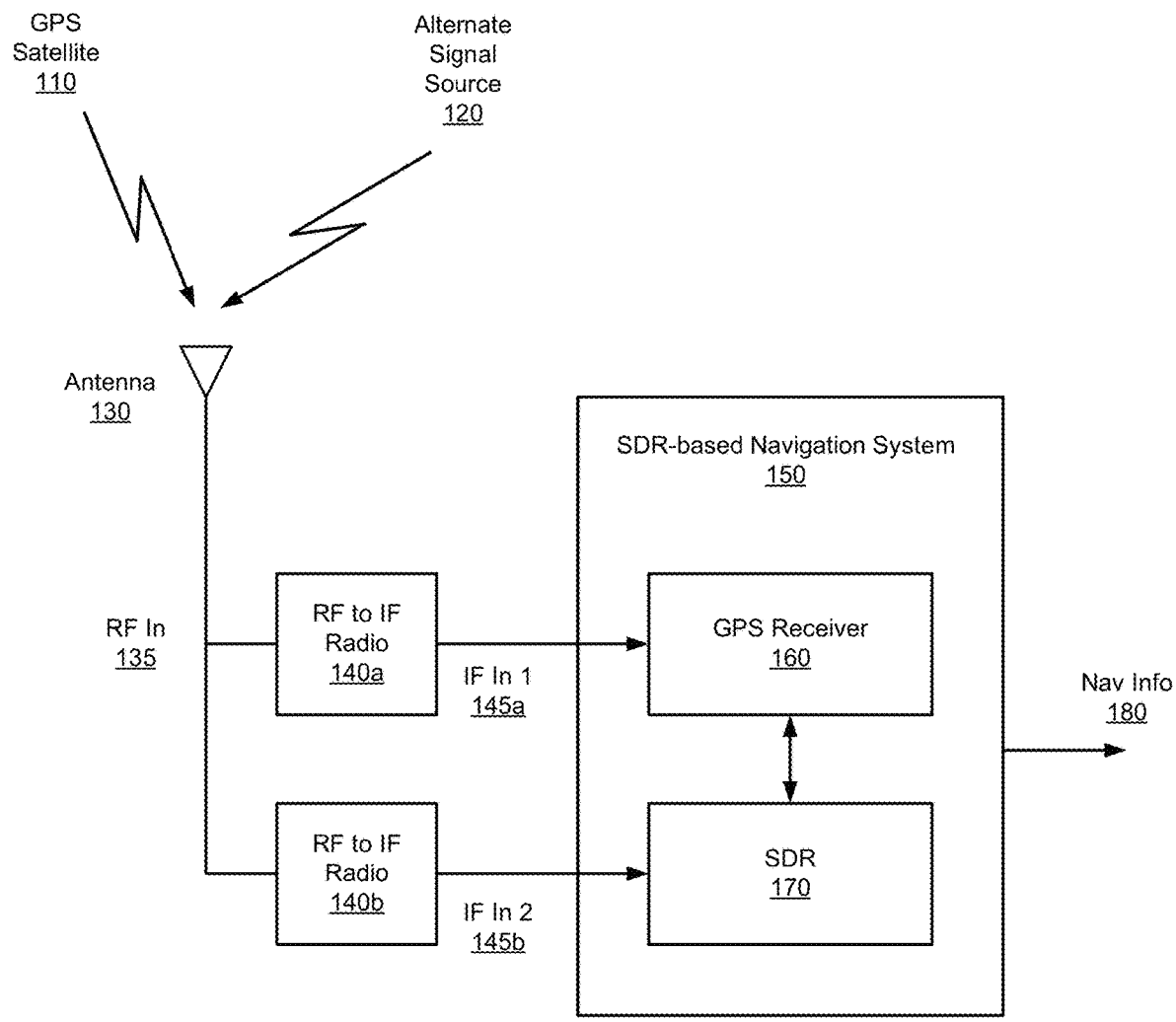
FIG. 1 illustrates an implementation of a navigation system employing an SDR, in accordance with an embodiment of the present disclosure.

Although the following Detailed Description will proceed with reference being made to illustrative embodiments, many alternatives, modifications, and variations thereof will be apparent to those skilled in the art.

DETAILED DESCRIPTION

Techniques are provided for employing an embedded software defined radio (SDR) in a navigation system. As noted previously, a constellation of GPS satellites broadcast time-based signals that can be received at various platforms and used to estimate a range from the platform to the satellites. These ranges can then be used to estimate the position of the platform and, in the case of moving platforms, to track the location of the platform over time. This calculated position and navigation information generally relies on the ability to receive signals from at least three GPS satellites, and preferably more, which may not always be possible. For instance, the number of visible (line of sight) satellites may be limited, for instance, within the confines of an underground parking garage or a valley of a mountainous area. Additionally, and particularly in military conflict scenarios, some of the satellites may be disabled by an adversary. As such, relying on GPS alone can be problematic.

To this end, and in accordance with an embodiment of the present disclosure, an SDR-based navigation system is disclosed which provides the ability to receive, through the SDR, additional time-based signals that can be used to augment or supplement the received GPS signals. In some embodiments, these additional time-based signals can be communication signals such as cellular phone signals (e.g., 5G signals) and the like. In some embodiments, these additional time-based signals can be signals transmitted from alternative satellite constellations (e.g., other than GPS) that are configured to provide navigation capabilities for receiving platforms. More generally, these additional time-based signals can be any signals that include timing information which can be used to estimate a range from the platform to the source of the signal, which allows for an improved platform position and navigation calculations, as will be explained in greater detail below. Additionally, the processing capabilities of the SDR can be employed to decode the received communication signals for other purposes such as providing mobile communication capabilities or any other suitable purpose. The SDR provides increased flexibility for navigation and communication applications due to the ability to update or otherwise tailor the software that executes on processors embedded in the radio to specific requirements that depend on the particular application or environment.

The disclosed techniques can be implemented, for example, in a gate-level logic device, a microprocessor, an embedded processor, or a software product executable or otherwise controllable by such systems, although other embodiments will be apparent in light of this disclosure. In accordance with an embodiment, a navigation system implementing the techniques includes a GPS receiver configured to acquire and track received GPS signals. The system also includes an SDR configured to process received communication signals that include timing data. The SDR is further configured to calculate position and navigation data based on a combination of the processed communication signals and the tracked GPS signals provided by the GPS receiver, as will be described below. The system further includes a system timer configured to provide a common time base for use by the GPS receiver and the SDR. In some embodiments, the navigation system is implemented in an application specific integrated circuit (ASIC) to reduce size, weight, and power requirements.

It will be appreciated that the disclosed techniques for SDR-based navigation, as described herein, may provide improved reliability and accuracy, compared to existing techniques that rely on a single source of timing/ranging data such as the GPS satellite constellation. The techniques disclosed herein may further be implemented in hardware or software or a combination thereof. Numerous embodiments and applications will be apparent in light of this disclosure.

System Architecture

FIG. 1 illustrates an implementation 100 of a navigation system employing an SDR, in accordance with an embodiment of the present disclosure. As shown in this implementation, an antenna 130 is configured to receive one or more radio frequency (RF) signals from GPS satellites 110 and to receive one or more RF signals from alternate signal sources 120. The alternate signal sources 120 may include other navigational satellites and/or other transmitters of time-based communication signals which need not necessarily be intended for navigation purposes. The implementation also shows radios 140a and 140b which are configured to convert the received RF signals down to intermediate frequency (IF) signals to be provided to an SDR-based navigation system 150. IF input signal 1 145a is provided to a GPS receiver 160, and IF input signal 2 145b is provided to an SDR 170. The SDR-based navigation system 150 is configured to combine the information provided by the GPS satellites with the information provided by the alternate signal sources to calculate position and navigation information 180 of improved quality and increased reliability compared to that which could be obtained from GPS signals alone, as will be explained in greater detail below. Additionally, the SDR 170 is configured to process the received communication signals for other purposes. For example, the embedded SDR allows for flexible processing of many types of signal waveforms, whether transmitted from known sources or received as signals of opportunity, because the SDR is controlled by programmable software.

Figure 2:
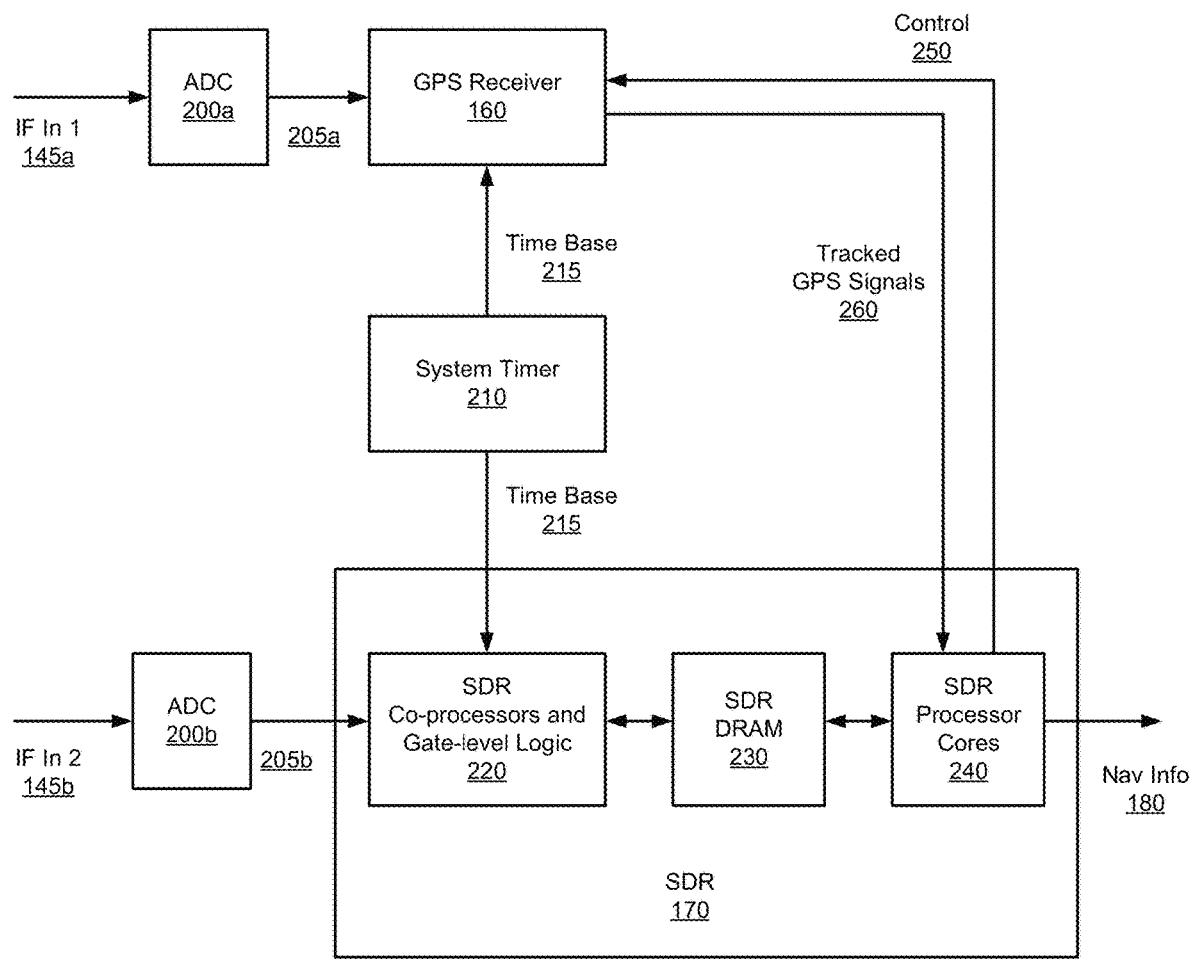
FIG. 2 is a block diagram of the SDR-based navigation system of FIG. 1, configured in accordance with an embodiment of the present disclosure.

FIG. 2 is a block diagram of the SDR-based navigation system 150 of FIG. 1, configured in accordance with an embodiment of the present disclosure. The SDR-based navigation system 150 is shown to include analog to digital converters (ADCs) 200, the GPS receiver 160, a system timer 210, and the SDR 170. The SDR 170 is shown to further include co-processors and gate-level logic circuits 220, a memory 230, and processor cores 240. In some embodiments, the memory 230 may be implemented as dynamic ram (DRAM).

ADC 200a is configured to convert the first analog IF input signal 145a into a first digital IF input signal 205a. ADC 200b is configured to convert the second analog IF input signal 145b into a second digital IF input signal 205b. In some embodiments, the ADCs are configured as wideband ADCs (e.g., sample rates in the range of 80 kHz to 50 MHz) with software tunable frequency conversions.

The system timer 210 is configured to provide a common time base 215 for use by the GPS receiver and the SDR for synchronization, as will be explained in greater detail below.

The GPS receiver 160 is configured to acquire and track GPS signals included in the first digital IF input signal 205a. The GPS receiver 160 operates on the common time base 215 provided by the system timer 210 and may be implemented using suitable GPS receiver techniques, in light of the present disclosure. The GPS receiver 160 operates under control 250 of one (or more) of the SDR processor cores 240 and provides tracked GPS signals 260 back to that processor core.

The operation of the SDR 170 will be described in greater detail below, but at a high level, the SDR 170 is configured to process time-based communication signals that are included in the second digital IF input signal 205b, and to calculate position and navigation data based on a combination of the processed communication signals and the tracked GPS signals 260 provided by the GPS receiver.

Figure 3:
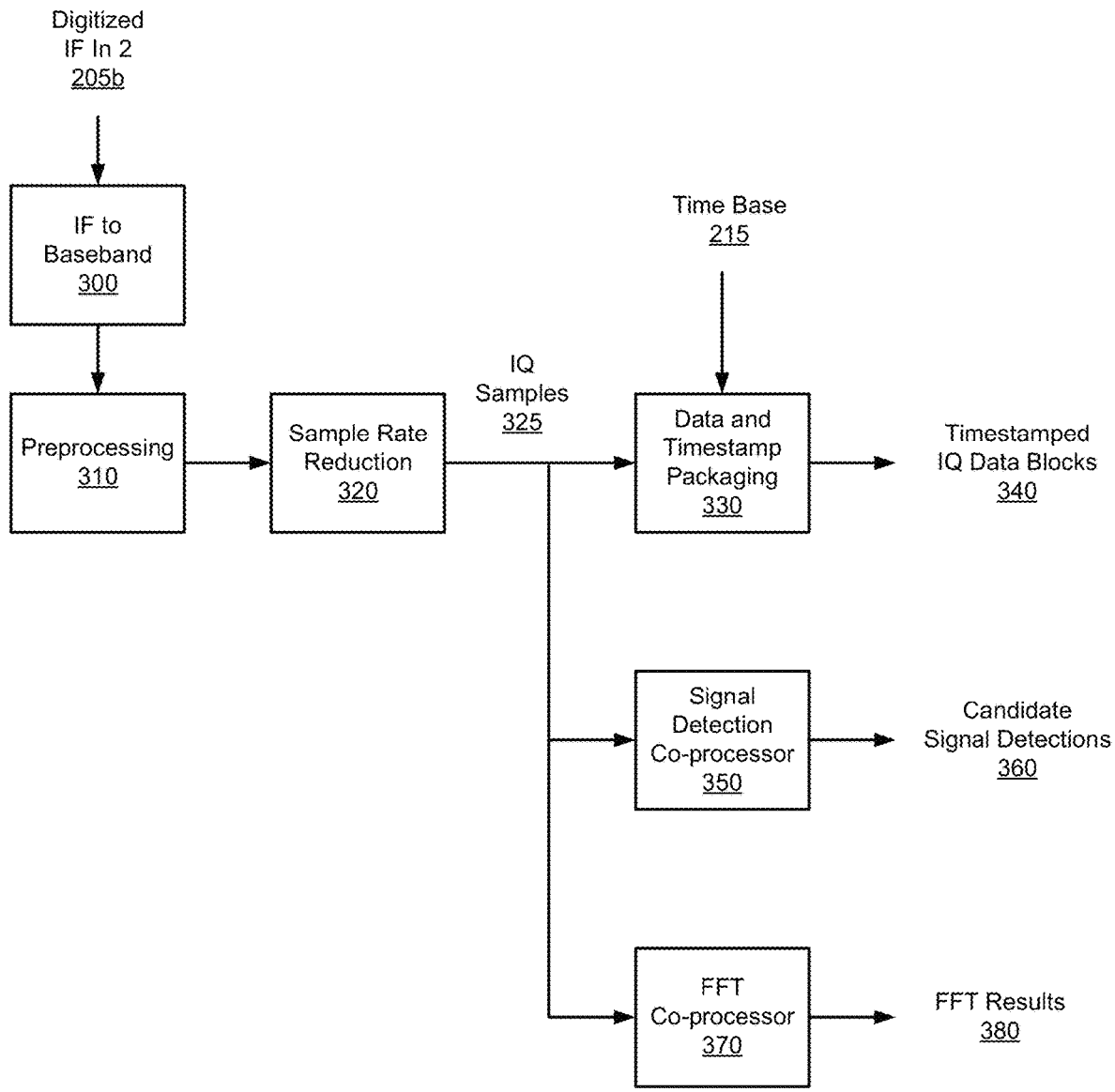
FIG. 3 is a block diagram of the co-processors and associated circuits of the SDR of FIG. 2, configured in accordance with an embodiment of the present disclosure.

FIG. 3 is a block diagram of the co-processors and associated gate-level logic circuits 220 of the SDR of FIG. 2, configured in accordance with an embodiment of the present disclosure. This portion of the SDR is shown to include an IF to baseband converter 300, a preprocessing circuit 310, a sample rate reduction circuit 320, a data and timestamp packaging circuit 330, a signal detection co-processor 350, and a fast Fourier transform (FFT) co-processor 370.

The IF to baseband converter 300 is configured to frequency shift the digitized IF signal 205b down to a baseband frequency range. The optional preprocessing circuit 310 is configured to perform any desired signal preprocessing operations. In some embodiments, preprocessing may include jamming mitigation which may be implemented using any suitable techniques, in light of the present disclosure. The sample rate reduction circuit 320 is configured to reduce the sampling rate of the preprocessed signal, for example by sub-sampling, decimation, or any other suitable method, in light of the present disclosure, to produce in-phase (I) and quadrature (Q) samples of the received communications at a suitable sampling rate for further processing. In some embodiments, the IF to baseband converter 300, preprocessing circuit 310, and sample rate reduction circuit 320 may be implemented as gate-level logic circuits of an ASIC that operate under control of software executing on the processing cores 240.

The data and timestamp packaging circuit 330 is configured to group I and Q samples of the received communications signals into IQ data blocks and to generate a timestamp for each of the IQ data blocks 340. The timestamp is based on the common time base 215 provided by the system timer 210. The data and timestamp packaging circuit 330 is further configured to store the IQ data blocks 340 and associated timestamps into an IQ data circular buffer 400, as described below in connection with FIG. 4. The stored IQ data blocks are thus made available for further processing by the signal detection co-processor 350, the FFT co-processor 370, and the processor cores 240, as described below.

The signal detection co-processor 350 is configured to perform a two-dimensional correlation based search for software defined signal patterns in the received communication signals, for example the signals stored in the IQ data circular buffer 400. In some embodiments, the two search dimensions are doppler frequency and time offset. The search may be performed under control of software applications executing on the processor cores 240. Candidate signal search results 360 are stored in a detection data buffer 430, as described below in connection with FIG. 4. The candidate search results 360 include an IQ data block identifier, a sample index into the identified IQ data block to identify the start of the candidate signal, and a doppler value and signal strength associated with the candidate signal.

The FFT co-processor 370 is configured to transform IQ samples of the received communications signals, stored in the IQ data circular buffer 400, into frequency domain samples 380, under control of software applications executing on the processor cores 240. In some embodiments, the FFT size may range up to 4096 point FFTs. The FFT co-processor allows for offloading of high computation rate FFT tasks from the processor cores. The resulting frequency domain results 380 may then be stored into FFT data blocks in an FFT data buffer 460, as described below in connection with FIG. 4.

Figure 4:
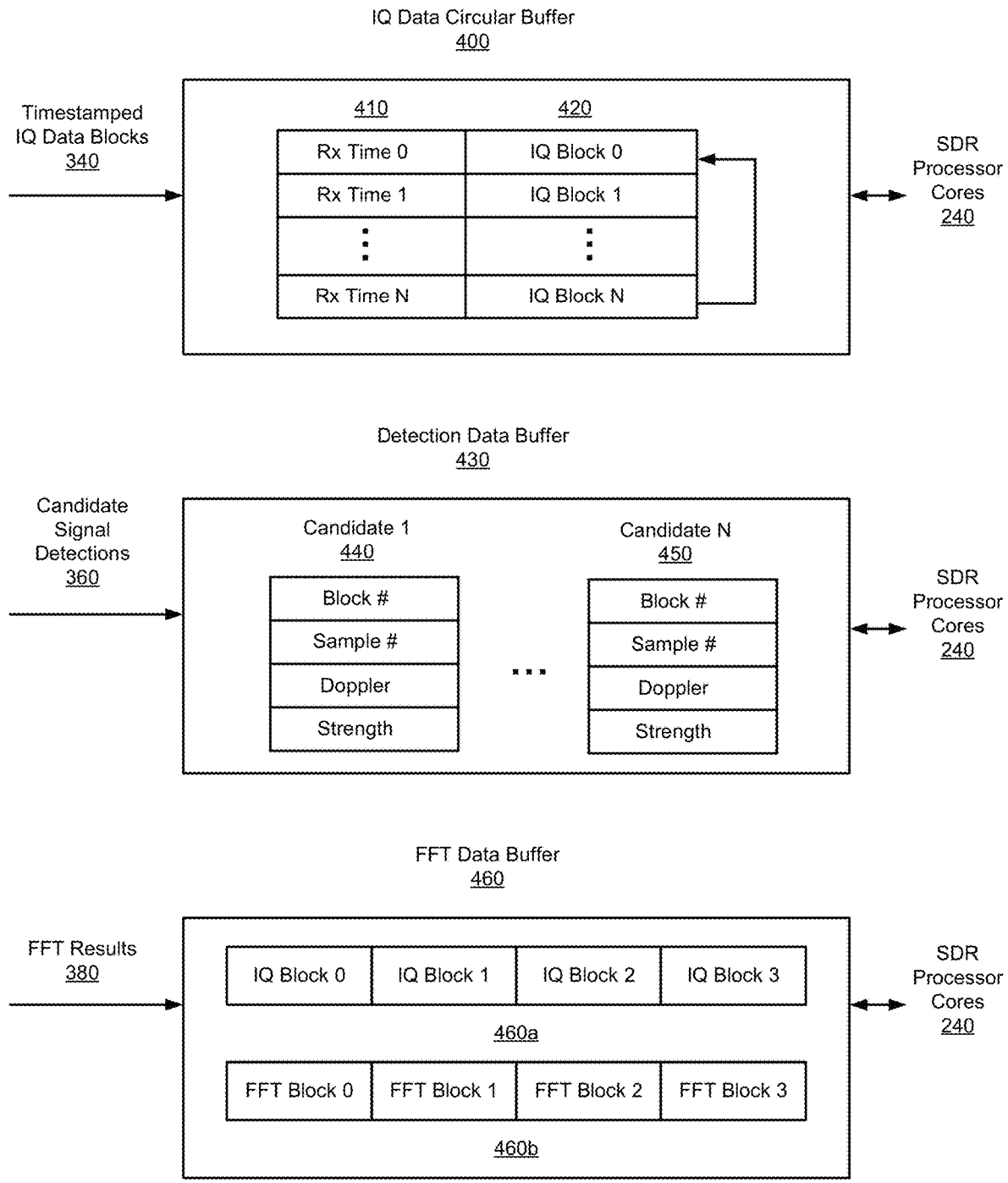
FIG. 4 illustrates the memory of the SDR of FIG. 2, configured in accordance with an embodiment of the present disclosure.

FIG. 4 illustrates the memory (DRAM) 230 of the SDR of FIG. 2, configured in accordance with an embodiment of the present disclosure. The DRAM 230 is configured to provide an interface between the SDR co-processors and associated gate-level logic circuits 220 and the SDR processor cores

240. The DRAM 230 is shown to include an IQ data circular buffer 400, a detection data buffer 430, and FFT data buffers 460.

The IQ data circular buffer 400 is configured to store the timestamped IQ data blocks 340 in a circular buffer for subsequent access and processing by the signal detection co-processor 350, the FFT co-processor 370, and the processor cores 240. Each entry in the buffer may include a timestamp 410 and an associated block of IQ data 420.

The detection data buffer 430 is configured to store candidate signal search results 360 provided by the signal detection co-processor 350. Each candidate signal search result (e.g., candidate 1 440 through candidate N 450) includes an IQ data block identifier and a sample index to provide a location in the IQ data circular buffer of the IQ samples of the received communications signals associated with the candidate search results. In some embodiments, each candidate signal search result also includes a doppler value and signal strength associated with the candidate signal, as calculated by the signal detection co-processor 350.

The FFT data buffers 460 is configured to store FFT data blocks 460*b* as computed by the FFT co-processor 370. In some embodiments, one of the processor cores may load IQ data blocks of interest 460*a* into the FFT data buffers, for example by copying them from the ID data circular buffer 400, and then instruct the FFT co-processor 370 to generate corresponding FFT data blocks 460*b*.

Figure 5:
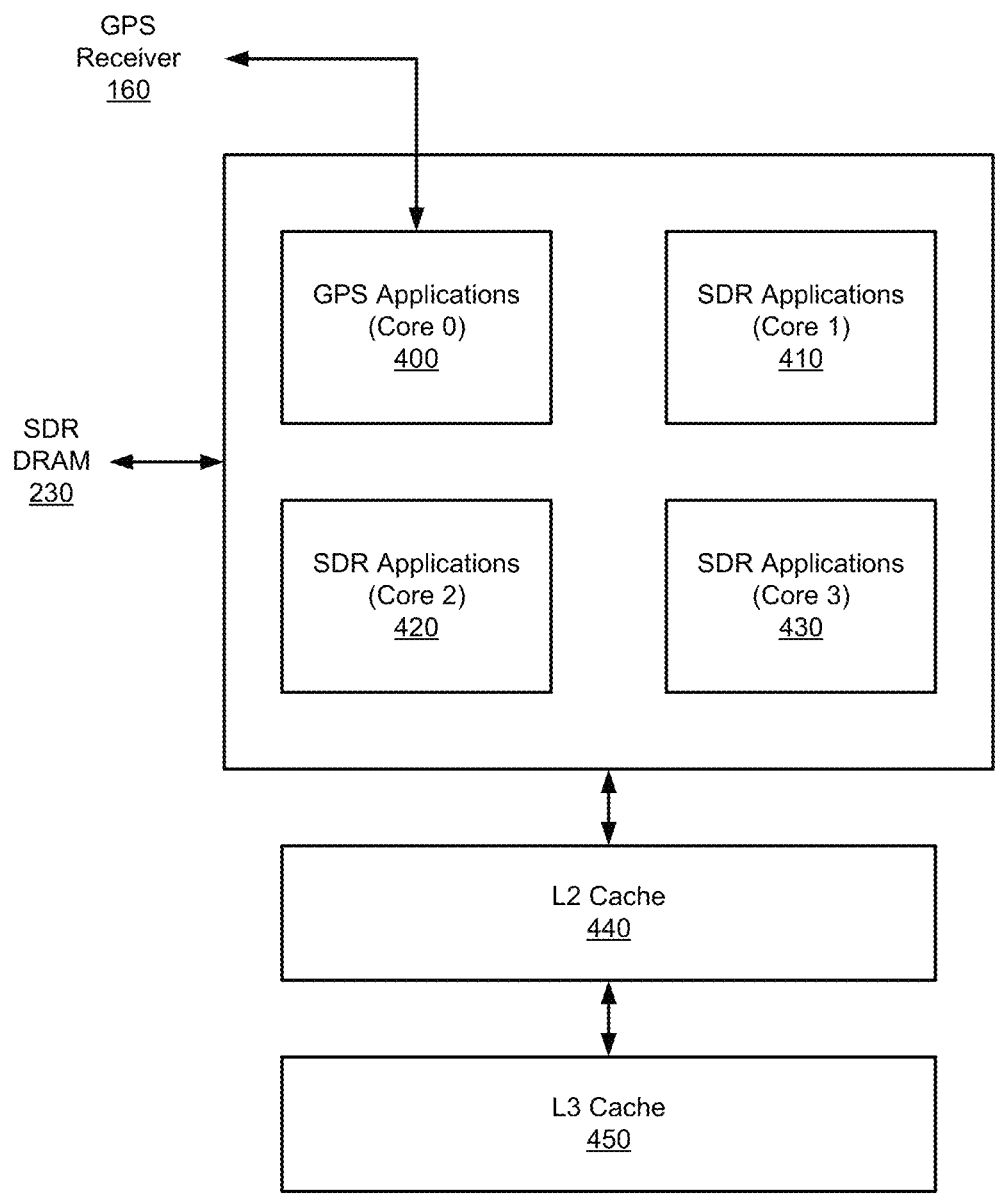
FIG. 5 is a block diagram of the processor cores of the SDR of FIG. 2, configured in accordance with an embodiment of the present disclosure.

FIG. 5 is a block diagram of the processor cores 240 of the SDR of FIG. 2, configured in accordance with an embodiment of the present disclosure. This portion of the SDR is shown to include four processor cores 400, 410, 420, and 430, along with a level 2 cache memory 440 and a level 3 cache memory 450. The processor cores allow for the execution of application software that provides increased flexibility and capability to process received signals.

In some embodiments, processor core 0 is configured to execute a GPS application 400 configured to process the tracked GPS signals to calculate ranges to the GPS satellites. The GPS application 400 may use any suitable techniques for range calculation, in light of the present disclosure.

In some embodiments, processor core 1 is configured to execute an SDR application 410 that is configured to provide the software defined signal patterns to the signal detection co-processor 350 and to control the FFT co-processor 370, for example by requesting frequency conversion of segments of data that are of interest. The SDR application 410 is also configured to calculate ranges to sources of the communication signals based on the data stored in the IQ data circular buffer 400, the signal search results stored in the detection data buffer 430, and the frequency converted data stored in the FFT data buffer 460. Ranges may be calculated using any suitable techniques, in light of the present disclosure.

The SDR application 410 is further configured to calculate position and navigation data based on a combination of the calculated ranges to the GPS satellites and the calculated ranges to the sources of the communication signals using any suitable techniques, in light of the present disclosure. The position and navigation data may be provided for use by navigational applications of the platform such as, for example, a guidance system or the like.

In some embodiments, processor cores 2 and 3 are configured to execute other SDR applications 420 and 430. In some embodiments, these applications may be configured to decode the received communication signals for use by additional applications (e.g., applications other than the navigational applications). For example, these applications may allow the SDR to be used as a radio to receive communications or to receive and process other signals of interest such as radar signals, etc.

The cache memories 440 and 450 are configured to provide relatively high speed working memory for the applications executing on the processor cores. In some embodiments, the L2 cache 440 may be a smaller but faster memory than the L3 cache 450.

Figure 6:
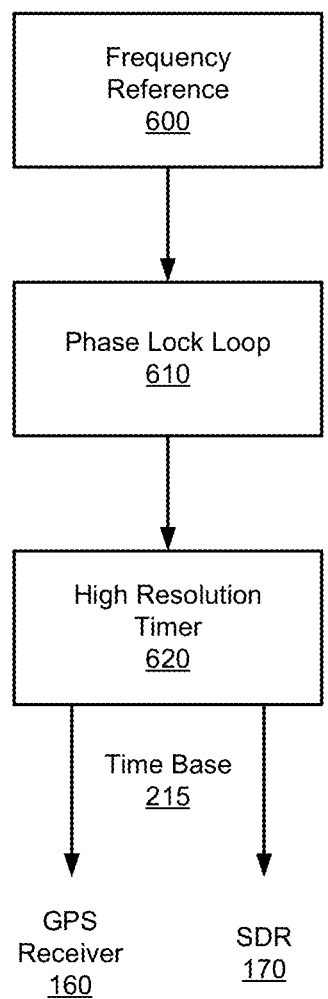
FIG. 6 is a block diagram of the system timer of the SDR-based navigation system of FIG. 2, configured in accordance with an embodiment of the present disclosure.

FIG. 6 is a block diagram of the system timer 210 of the SDR-based navigation system of FIG. 1, configured in accordance with an embodiment of the present disclosure. The system timer 210 is shown to include a frequency reference 600, a phase locked loop (PLL) 610, and a high resolution timer 620.

The frequency reference 600 is configured to provide a reference frequency signal at a desired frequency to drive the PLL. The PLL 610 is configured to generate a relatively stable clock signal at a frequency that is based on the provided reference frequency (e.g., a desired multiple of the reference frequency). The high resolution timer 620 is configured to generate a timing signal based on the PLL generated clock signal. For example, the timer may be implemented as a counter that increments on every rising or falling edge of the clock signal. The counter output can be used as the basis for a timestamp (e.g., the common time base 215). In some embodiments, the system timer 210 is implemented as a circuit that is independent (e.g., separate) form the GPS receiver 160 and the SDR 170.

In some embodiments, the counter may have a resolution on the order of one to two nanoseconds, and the timestamp may have a resolution on the order of 20 to 25 nanoseconds. The timestamps provide a common time base to the SDR and the GPS receiver that is synchronous for both systems. Thus, any errors in local receiver time in the GPS calculations and the SDR calculations will be common errors which allows for tracking and removal of that common error from either (or both) processing paths (GPS or SDR).

Methodology

Figure 7:
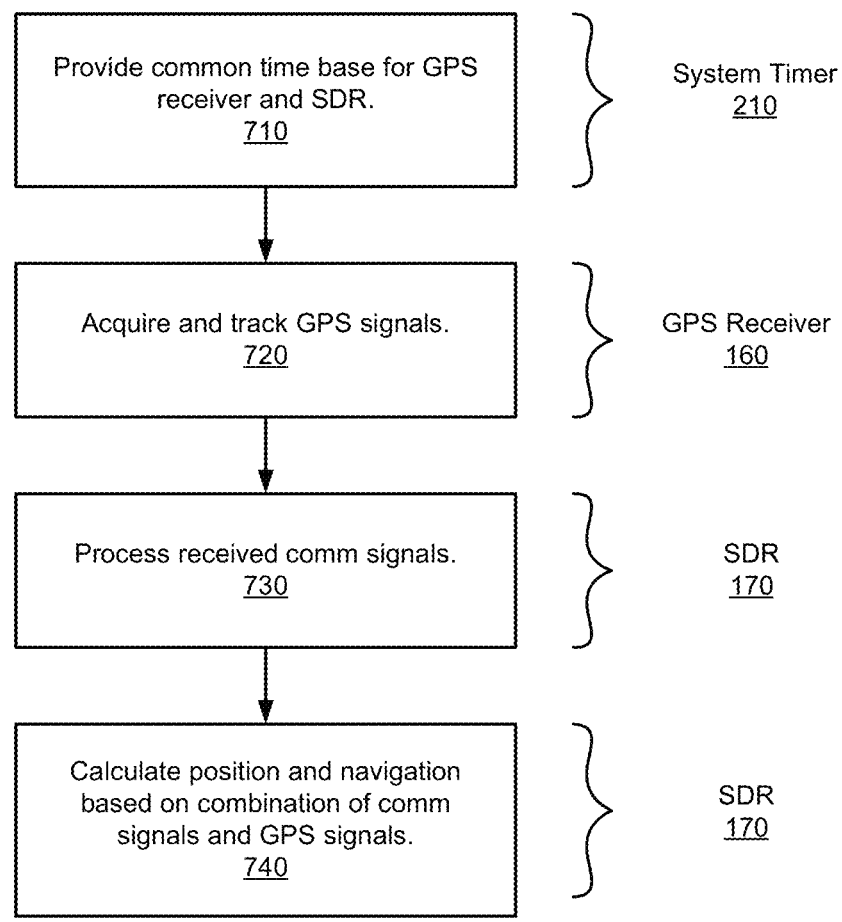
FIG. 7 is a flowchart illustrating a methodology for SDR-based navigation, in accordance with an embodiment of the present disclosure.

FIG. 7 is a flowchart illustrating a methodology 700 for SDR-based navigation, in accordance with an embodiment of the present disclosure. As can be seen, the example method includes a number of phases and sub-processes, the sequence of which may vary from one embodiment to another. However, when considered in the aggregate, these phases and sub-processes form a process for SDR-based navigation, in accordance with certain of the embodiments disclosed herein. These embodiments can be implemented, for example using the system architecture illustrated in FIGS. 1-6, as described above. However other system architectures can be used in other embodiments, as will be apparent in light of this disclosure. To this end, the correlation of the various functions shown in FIG. 7 to the specific components illustrated in FIGS. 1-6, is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 7, in one embodiment method 700 commences, at operation 710, by providing a common time base is provided for use by the GPS receiver and the SDR.

Next, at operation 720, GPS signals received from GPS satellites are acquired and tracked. The tracked GPS signals are processed to calculate ranges to the GPS satellites.

At operation 730, received communication signals are processed. The communication signals include timing data.

In some embodiments, the processing includes performing a two-dimensional correlation based search for software defined signal patterns to identify signal candidates and performing FFTs on segments of the communication signals to transform them to the frequency domain, as previously described.

At operation 740, position and navigation data are calculated based on a combination of the processed communication signals and the tracked GPS signals. In some embodiments, the calculation includes calculating ranges to sources of the communication signals based, at least in part, on the identified candidate signals and the frequency domain data.

Of course, in some embodiments, additional operations may be performed, as previously described in connection with the system. For example, the calculated position and navigation data may be provided to a navigational application to provide platform tracking to a user or other system. In some embodiments, the received communication signals may also be decoded and provided to other applications that make use of the information that is encoded in the communication signals.

Example Systems

Figure 8:
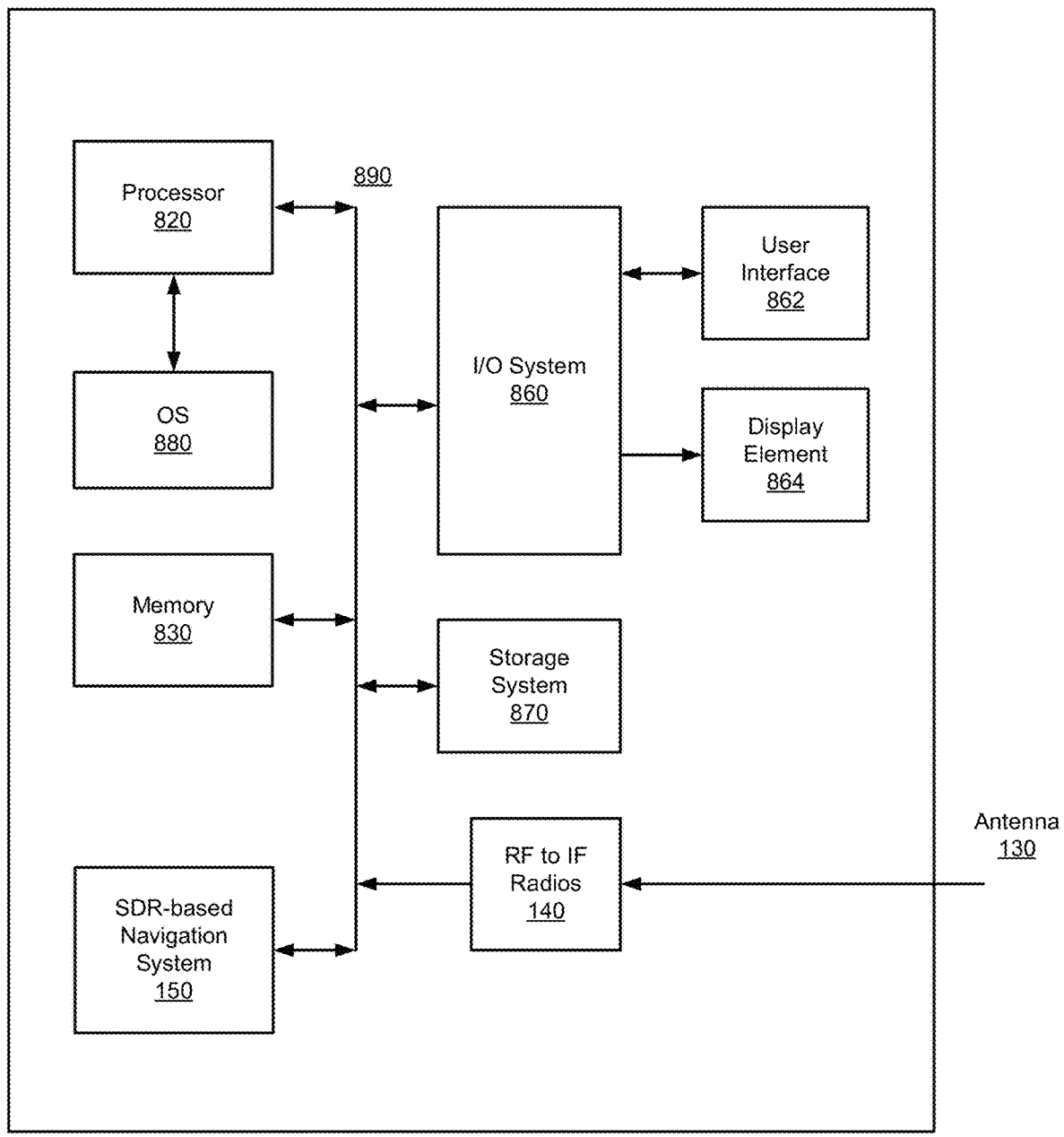
FIG. 8 is a block diagram of a platform for the SDR-based navigation system of FIG. 2, in accordance with certain embodiments of the present disclosure.

FIG. 8 is a block diagram of a platform 800 for the SDR-based navigation system of FIG. 1, in accordance with certain embodiments of the present disclosure. In some embodiments, the platform 800, or portions thereof, may be hosted on, or otherwise be incorporated into the electronic systems of an airborne platform, a space-based platform, or a ground-based platform including data communications systems, radar systems, computing systems, or embedded systems of any sort that can benefit from improved navigation capability with increased reliability. The disclosed techniques may also be used to improve navigation capability in other platforms including data communication devices, personal computers, workstations, laptop computers, tablets, touchpads, portable computers, handheld computers, cellular telephones, smartphones, or messaging devices. Any combination of different devices may be used in certain embodiments.

In some embodiments, platform 800 may comprise any combination of a processor 820, a memory 830, I/O system 860, storage system 870, the SDR-based navigation system 150, and RF to IF radios 140. As can be further seen, a bus 890 is also provided to allow for communication between the various components listed above and/or other components not shown. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor, a graphics processing unit, or hardware accelerator, to assist in control and processing operations associated with sensor system platform 800. In some embodiments, the processor 820 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multi-threaded cores in that they may include more than one hardware thread context (or "logical processor") per core. Processor 820 may be implemented as a complex instruction set computer (CISC) or a reduced instruction set computer (RISC) processor.

Memory 830 can be implemented using any suitable type of digital storage including, for example, flash memory and/or random access memory (RAM). In some embodiments, the memory 830 may include various layers of memory hierarchy and/or memory caches. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 820 may be configured to execute an Operating System (OS) 880 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with sensor system platform 800, and therefore may also be implemented using any suitable existing or subsequently-developed systems or platforms.

I/O system 860 may be configured to interface between various I/O devices and other components of platform 800. I/O devices may include, but not be limited to, user interface 862 and display element 864. User interface 862 may include other devices (not shown) such as a touchpad, keyboard, mouse, microphone and speaker, trackball, and scratch pad. I/O system 860 may include a graphics subsystem configured to perform processing of images for rendering on the display element 864. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 820 or any chipset of platform 800.

It will be appreciated that in some embodiments, some of the various components of sensor system platform 800 may be combined or integrated in a system-on-a-chip (SoC) architecture. In some embodiments, the components may be hardware components, firmware components, software components or any suitable combination of hardware, firmware or software.

SDR-based navigation system 150 is configured to provide position and navigation data for the platform based on a combination of GPS signals and time-based communication signals, as described previously. SDR-based navigation system 150 may include any or all of the circuits/components illustrated in FIGS. 1-6, as described above. These components can be implemented or otherwise used in conjunction with a variety of suitable software and/or hardware that is coupled to or that otherwise forms a part of platform 800. These components can additionally or alternatively be implemented or otherwise used in conjunction with user I/O devices that are capable of providing information to, and receiving information and commands from, a user.

Various embodiments of platform 800 may be implemented using hardware elements, software elements, or a combination of both. Examples of hardware elements may include processors, microprocessors, circuits, circuit elements (for example, transistors, resistors, capacitors, inductors, and so forth), integrated circuits, application-specific integrated circuits (ASICs, or other purpose-built semiconductors), programmable logic devices, digital signal processors, field programmable gate arrays (FPGAs), logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, causes one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments sensor system platform 800 may comprise additional, fewer, or alternative subcomponents as compared to those included in the example embodiment of FIG. 8.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate-level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some examples may be implemented, for example, using a machine-readable medium or article which may store an instruction or a set of instructions that, if executed by a machine, may cause the machine to perform a method and/or operations in accordance with an embodiment provided herein. Such a machine may include, for example, any suitable processing platform, computing platform, computing device, processing device, computing system, processing system, computer, process, or the like, and may be implemented using any suitable combination of hardware and/or software. The machine-readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, flash drives, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional structures that include hardware, or a combination of hardware and software, and may comprise, for example, singly or in any combination, hardwired circuitry, programmable circuitry such as computer processors comprising one or more individual instruction processing cores, state machine circuitry, and/or gate level logic. The circuitry may include a processor and/or controller programmed or otherwise configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable device. In any such hardware cases that include executable software, the terms "circuit" or "circuitry" are intended to include a combination of software and hardware such as a programmable device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a navigation system comprising: a global positioning system (GPS) receiver configured to acquire and track received GPS signals; a software defined radio (SDR) configured to process received communication signals that include timing data, the SDR further configured to calculate position and navigation data based on a combination of the processed communication signals and the tracked GPS signals provided by the GPS receiver; and a system timer configured to provide a common time base for use by the GPS receiver and the SDR.

Example 2 includes the navigation system of Example 1, wherein the SDR comprises a data timestamping circuit configured to group in-phase (I) and quadrature (Q) samples of the received communications signals into IQ data blocks, generate a timestamp for each of the IQ data blocks, and store the IQ data blocks and associated timestamps into an IQ data circular buffer, wherein the timestamp is based on the common time base.

Example 3 includes the navigation system of Example 2, wherein the SDR further comprises a signal detection co-processor configured to: perform a two-dimensional correlation based search of the received communication signals for software defined signal patterns, the two dimensions including doppler frequency and time offset; and store candidate search results in a detection data buffer, wherein the candidate search results include an IQ data block identifier, a sample index, a doppler value, and a signal strength, wherein the IQ data block identifier and the sample index provide a location in the IQ data circular buffer of IQ samples of the received communications signals associated with the candidate search results.

Example 4 includes the navigation system of Example 3, wherein the SDR further comprises a fast Fourier transform (FFT) co-processor configured to transform IQ samples of the received communications signals into frequency domain samples and store the frequency domain samples into FFT data blocks in an FFT data buffer.

Example 5 includes the navigation system of Example 4, wherein the SDR comprises a dynamic random access memory configured to store the IQ data circular buffer, the detection data buffer, and the FFT data buffer.

Example 6 includes the navigation system of Example 5, wherein the SDR comprises: a first processor core configured to process the tracked GPS signals to calculate ranges to the GPS satellites; and a second processor core configured to: provide the software defined signal patterns to the signal detection co-processor, control the FFT co-processor, calculate ranges to sources of the communication signals based on data stored in one or more of the IQ data circular buffer, the detection data buffer, and the FFT data buffer, and calculate position and navigation data based on a combination of the calculated ranges to the GPS satellites and the calculated ranges to the sources of the communication signals, the position and navigation data for use by navigational applications.

Example 7 includes the navigation system of any of Example 1-6, wherein the SDR comprises processor cores configured to decode the received communication signals for use by applications other than navigational applications.

Example 8 includes the navigation system of any of Example 1-7, wherein the system timer comprises a frequency reference, a phase locked loop (PLL), and a high resolution timer.

Example 9 is a computer program product including one or more non-transitory machine-readable mediums encoded with instructions that when executed by one or more processors cause a process to be carried out for communication and navigation, the process comprising: providing a common time base for use by a global positioning system (GPS) receiver and a software defined radio (SDR); acquiring and tracking, by the GPS receiver, GPS signals received from GPS satellites; processing, by the SDR, received communication signals that include timing data; and calculating, by the SDR, position and navigation data based on a combination of the processed communication signals and the tracked GPS signals.

Example 10 includes the computer program product of Example 9, wherein the process further comprises grouping in-phase (I) and quadrature (Q) samples of the received communications signals into IQ data blocks, generating a timestamp for each of the IQ data blocks, and storing the IQ data blocks and associated timestamps into an IQ data circular buffer, wherein the timestamp is based on the common time base.

Example 11 includes the computer program product of Example 10, wherein the process further comprises: performing a two-dimensional correlation based search of the received communication signals for software defined signal patterns, the two dimensions including doppler frequency and time offset; and storing candidate search results in a detection data buffer, wherein the candidate search results include an IQ data block identifier, a sample index, a doppler value, and a signal strength, wherein the IQ data block identifier and the sample index provide a location in the IQ data circular buffer of IQ samples of the received communications signals associated with the candidate search results.

Example 12 includes the computer program product of Example 11, wherein the process further comprises transforming IQ samples of the received communications signals into frequency domain samples and storing the frequency domain samples into FFT data blocks in an FFT data buffer.

Example 13 includes the computer program product of Example 12, wherein the process further comprises: processing the tracked GPS signals to calculate ranges to the GPS satellites; calculating ranges to sources of the communication signals based on data stored in one or more of the IQ data circular buffer, the detection data buffer, and the FFT data buffer, and calculating position and navigation data based on a combination of the calculated ranges to the GPS satellites and the calculated ranges to the sources of the communication signals, the position and navigation data for use by navigational applications.

Example 14 includes the computer program product of Example 9, wherein the process further comprises decoding the received communication signals for use by applications other than navigational applications.

Example 15 is a method for communication and navigation, the method comprising: providing a common time base for use by a global positioning system (GPS) receiver and a software defined radio (SDR); acquiring and tracking, by the GPS receiver, GPS signals received from GPS satellites; processing, by the SDR, received communication signals that include timing data; and calculating, by the SDR, position and navigation data based on a combination of the processed communication signals and the tracked GPS signals.

Example 16 includes the method of Example 15, further comprising grouping in-phase (I) and quadrature (Q) samples of the received communications signals into IQ data blocks, generating a timestamp for each of the IQ data blocks, and storing the IQ data blocks and associated timestamps into an IQ data circular buffer, wherein the timestamp is based on the common time base.

Example 17 includes the method of Example 16, further comprising: performing a two-dimensional correlation based search of the received communication signals for software defined signal patterns, the two dimensions including doppler frequency and time offset; and storing candidate search results in a detection data buffer, wherein the candidate search results include an IQ data block identifier, a sample index, a doppler value, and a signal strength, wherein the IQ data block identifier and the sample index provide a location in the IQ data circular buffer of IQ samples of the received communications signals associated with the candidate search results.

Example 18 includes the method of Example 17, further comprising transforming IQ samples of the received communications signals into frequency domain samples and storing the frequency domain samples into FFT data blocks in an FFT data buffer.

Example 19 includes the method of Example 18, further comprising: processing the tracked GPS signals to calculate ranges to the GPS satellites; calculating ranges to sources of the communication signals based on data stored in one or more of the IQ data circular buffer, the detection data buffer, and the FFT data buffer, and calculating position and navigation data based on a combination of the calculated ranges to the GPS satellites and the calculated ranges to the sources of the communication signals, the position and navigation data for use by navigational applications.

Example 20 includes the method of Example 15, wherein the common time base is provided by a system timer that is independent from the GPS and the SDR.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A navigation system comprising:
    a global positioning system (GPS) receiver configured to acquire and track received GPS signals;
    a software defined radio (SDR) configured to process received communication signals that include timing data, the SDR further configured to calculate position and navigation data based on a combination of the processed communication signals and the tracked GPS signals provided by the GPS receiver; and
    a system timer configured to provide a common time base for use by the GPS receiver and the SDR.

2. The navigation system of claim 1, wherein the SDR comprises a data timestamping circuit configured to group in-phase (I) and quadrature (Q) samples of the received communications signals into IQ data blocks, generate a timestamp for each of the IQ data blocks, and store the IQ data blocks and associated timestamps into an IQ data circular buffer, wherein the timestamp is based on the common time base.

3. The navigation system of claim 2, wherein the SDR further comprises a signal detection co-processor configured to:
    perform a two-dimensional correlation based search of the received communication signals for software defined signal patterns, the two dimensions including doppler frequency and time offset; and
    store candidate search results in a detection data buffer, wherein the candidate search results include an IQ data block identifier, a sample index, a doppler value, and a signal strength, wherein the IQ data block identifier and the sample index provide a location in the IQ data circular buffer of IQ samples of the received communications signals associated with the candidate search results.

4. The navigation system of claim 3, wherein the SDR further comprises a fast Fourier transform (FFT) co-processor configured to transform IQ samples of the received communications signals into frequency domain samples and store the frequency domain samples into FFT data blocks in an FFT data buffer.

5. The navigation system of claim 4, wherein the SDR comprises a dynamic random access memory configured to store the IQ data circular buffer, the detection data buffer, and the FFT data buffer.

6. The navigation system of claim 5, wherein the SDR comprises:
a first processor core configured to process the tracked GPS signals to calculate ranges to the GPS satellites; and
a second processor core configured to:
provide the software defined signal patterns to the signal detection co-processor,
control the FFT co-processor,
calculate ranges to sources of the communication signals based on data stored in one or more of the IQ data circular buffer, the detection data buffer, and the FFT data buffer, and
calculate position and navigation data based on a combination of the calculated ranges to the GPS satellites and the calculated ranges to the sources of the communication signals, the position and navigation data for use by navigational applications.

7. The navigation system of claim 1, wherein the SDR comprises processor cores configured to decode the received communication signals for use by applications other than navigational applications.

8. The navigation system of claim 1, wherein the system timer comprises a frequency reference, a phase locked loop (PLL), and a high resolution timer.

9. A computer program product including one or more non-transitory machine-readable mediums encoded with instructions that when executed by one or more processors cause a process to be carried out for communication and navigation, the process comprising:
providing a common time base for use by a global positioning system (GPS) receiver and a software defined radio (SDR);
acquiring and tracking, by the GPS receiver, GPS signals received from GPS satellites;
processing, by the SDR, received communication signals that include timing data; and
calculating, by the SDR, position and navigation data based on a combination of the processed communication signals and the tracked GPS signals.

10. The computer program product of claim 9, wherein the process further comprises grouping in-phase (I) and quadrature (Q) samples of the received communications signals into IQ data blocks, generating a timestamp for each of the IQ data blocks, and storing the IQ data blocks and associated timestamps into an IQ data circular buffer, wherein the timestamp is based on the common time base.

11. The computer program product of claim 10, wherein the process further comprises:
performing a two-dimensional correlation based search of the received communication signals for software defined signal patterns, the two dimensions including doppler frequency and time offset; and
storing candidate search results in a detection data buffer, wherein the candidate search results include an IQ data block identifier, a sample index, a doppler value, and a signal strength, wherein the IQ data block identifier and the sample index provide a location in the IQ data circular buffer of IQ samples of the received communications signals associated with the candidate search results.

12. The computer program product of claim 11, wherein the process further comprises transforming IQ samples of the received communications signals into frequency domain samples and storing the frequency domain samples into FFT data blocks in an FFT data buffer.

13. The computer program product of claim 12, wherein the process further comprises:
processing the tracked GPS signals to calculate ranges to the GPS satellites;
calculating ranges to sources of the communication signals based on data stored in one or more of the IQ data circular buffer, the detection data buffer, and the FFT data buffer, and
calculating position and navigation data based on a combination of the calculated ranges to the GPS satellites and the calculated ranges to the sources of the communication signals, the position and navigation data for use by navigational applications.

14. The computer program product of claim 9, wherein the process further comprises decoding the received communication signals for use by applications other than navigational applications.

15. A method for communication and navigation, the method comprising:
providing a common time base for use by a global positioning system (GPS) receiver and a software defined radio (SDR);
acquiring and tracking, by the GPS receiver, GPS signals received from GPS satellites;
processing, by the SDR, received communication signals that include timing data; and
calculating, by the SDR, position and navigation data based on a combination of the processed communication signals and the tracked GPS signals.

16. The method of claim 15, further comprising grouping in-phase (I) and quadrature (Q) samples of the received communications signals into IQ data blocks, generating a timestamp for each of the IQ data blocks, and storing the IQ data blocks and associated timestamps into an IQ data circular buffer, wherein the timestamp is based on the common time base.

17. The method of claim 16, further comprising:
performing a two-dimensional correlation based search of the received communication signals for software defined signal patterns, the two dimensions including doppler frequency and time offset; and
storing candidate search results in a detection data buffer, wherein the candidate search results include an IQ data block identifier, a sample index, a doppler value, and a signal strength, wherein the IQ data block identifier and the sample index provide a location in the IQ data circular buffer of IQ samples of the received communications signals associated with the candidate search results.

18. The method of claim 17, further comprising transforming IQ samples of the received communications signals into frequency domain samples and storing the frequency domain samples into FFT data blocks in an FFT data buffer.

19. The method of claim 18, further comprising:
processing the tracked GPS signals to calculate ranges to the GPS satellites;
calculating ranges to sources of the communication signals based on data stored in one or more of the IQ data circular buffer, the detection data buffer, and the FFT data buffer, and
calculating position and navigation data based on a combination of the calculated ranges to the GPS satellites and the calculated ranges to the sources of the communication signals, the position and navigation data for use by navigational applications.

20. The method of claim 15, wherein the common time base is provided by a system timer that is independent from the GPS and the SDR.

* * * * *